United States Patent [19]

Kreijger et al.

[11] 4,443,252

[45] Apr. 17, 1984

[54] PROCESS FOR PRODUCING STEEL IN A CONVERTER FROM PIG IRON AND FERROUS SCRAP

[75] Inventors: Pieter J. Kreijger, Castricum; Gerardus P. Bührmann, Velsen-Zuid, both of Netherlands

[73] Assignee: Hoogovens Groep B.V., Netherlands

[21] Appl. No.: 475,973

[22] Filed: Mar. 16, 1983

[30] Foreign Application Priority Data

Mar. 26, 1982 [NL] Netherlands ............... 8201269

[51] Int. Cl.³ ............................................ C21C 7/00
[52] U.S. Cl. ............................................ 75/48; 75/52; 75/59; 75/60
[58] Field of Search ................... 75/52, 59, 60, 48

[56] References Cited

U.S. PATENT DOCUMENTS

| | | | |
|---|---|---|---|
| 3,854,932 | 12/1974 | Bishop | 75/60 |
| 4,089,677 | 5/1978 | Spenceley | 75/60 |
| 4,302,244 | 11/1981 | Sieckman | 75/60 |
| 4,304,598 | 12/1981 | von Bogdandy | 75/60 |
| 4,325,730 | 4/1982 | Schleimer | 75/60 |
| 4,329,171 | 5/1982 | Robert | 75/60 |
| 4,358,314 | 11/1982 | Normanton | 75/60 |

*Primary Examiner*—Peter D. Rosenberg
*Attorney, Agent, or Firm*—Stevens, Davis, Miller & Mosher

[57] ABSTRACT

A process of producing steel in a converter, wherein the starting materials comprise pig iron and ferrous scrap, involves blowing of oxygen into the molten metal bath in the converter. Advantageous results, in particular savings of Fe and Mn and in the amount of liquid metal used, are obtained by the combination of the following process steps:

(a) during at least part of the time of blowing oxygen into the bath, inert gas is passed through the bottom of converter into the bath, (b) during at least part of the time of blowing oxygen into the bath, secondary oxygen is blown into the atmosphere above the bath, (c) at least once during the time of blowing oxygen into the bath, carbon is added to the reaction from above.

9 Claims, 7 Drawing Figures

PROCESS FOR PRODUCING STEEL IN A CONVERTER FROM PIG IRON AND FERROUS SCRAP

BACKGROUND OF THE INVENTION

1. Field of the Invention

The invention relates to a process for producing steel in a converter wherein the starting materials comprise pig iron and ferrous scrap and in which oxygen is blown into the molten metal bath in the converter.

2. Description of the Prior Art

As is known, the converter steel production process is governed by a number of chemical reactions, such as the combustion of carbon (partly into CO and partly into $CO_2$), the combustion of phosphorus, silicon and manganese, and the combustion of iron. By adding calcareous slag to the converter the oxides formed and also sulphur can be separated from the steel bath and absorbed into the layer of slag.

The quantity of scrap which can be included in the contents of the converter is determined by the heat balance of the various reactions occurring and the required tapping temperature. As a rule, scrap is considerably cheaper than molten pig iron, and it is therefore usually desirable, in order to achieve a low cost price, to maximize the use of scrap.

Although the combustion of phosphorus, silicon, manganese and iron contribute to the heat balance, and the presence of the oxides formed in the slag does have certain advantages, it is advisable for economic reasons to limit the combustion of manganese and iron. Among other things because of the rapidity of the converter process, the so-called dynamic equilibrium, which arises in practice, of the various elements present in the steel bath and the slag is considerably more unfavourable than the theoretical thermodynamic equilibrium. Attempts have therefore been made to find a method in which the oxidation of manganese and iron is limited and the use of scrap is increased.

By bubbling inert gas through the bath from the bottom of the converter, a more homogeneous steel bath can be obtained, which appears to result in a lower absorption of iron into the slag and in a reduction in the combustion of manganese. Particularly for pig iron with a low phosphorus content, it has however been found that this bubbling technique can indeed give reduced combustion of iron and manganese but in many cases a reduced use of scrap has to be accepted in order to reach the required tapping temperature. Dutch patent application No. 8105221 (European patent application No. 82201426) describes a structure which makes it possible to pass inert gas through a porous bottom brick in the converter.

Dutch patent application No. 8104474 (European patent application No. 82201165) describes a structure for an oxygen blowing lance which has, above the main oxygen blowing head, outlets for secondary oxygen which is blown above the surface of the steel bath. It is known that by means of this secondary oxygen more of the CO formed from the bath can be converted to $CO_2$, which contributes to the heat balance with the consequence of a possible increase in the amount of scrap used.

It has also been suggested that during the blowing of oxygen a quantity of carbon-containing material is added to the reaction, to serve as fuel and thus raise the bath temperature. In general however it has been found that a carbon-containing fuel added in this way is burned with very poor thermal efficiency.

SUMMARY OF THE INVENTION

The object of this invention is principally to provide a process for producing steel in a converter from pig iron and ferrous scrap, which enables a greater proportion of pig iron to be used in the starting material while avoiding excessive combustion of iron and manganese.

Surprisingly, it has now been found that improved results can be achieved if the following three steps, each of which is known in itself are applied in combination:

(a) during at least part of the time of blowing oxygen into the bath, inert gas is passed through the bottom of converter into the bath, (b) during at least part of the time of blowing oxygen into the bath, secondary oxygen is blown into the atmosphere above the bath, (c) at least once during the time of blowing oxygen into the bath, carbon is added to the reaction from above.

As will be described below, the application of this combination of measures makes possible an increase in the amount of scrap used which is surprisingly higher than what would have been expected from the individual effects of these measures. It has been found that this combination of measures results in a considerably higher thermal efficiency for the combustion of the carbon added to the reaction. Unexpectively the combination of the three measures apparently does not have any detrimental effect on the saving of manganese and iron which can be achieved by applying the bubbling technique.

It has been found in particular that the advantages mentioned can be obtained when a low-phosphorus pig iron is used as a starting material i.e. pig iron containing less than about 0,2% P.

It has also been found that, as well as the savings of iron and manganese, a considerable improvement in the amount of scrap which can be added is obtainable if the amount of inert gas passed into the bath is at a low level (e.g. below 2 $Nm^3/h$ per ton) during the beginning of the oxygen blowing time and during a final portion of the oxygen blowing time is at a level in the range 4 to 8 $Nm^3/h$ per ton.

Where nitrogen is used as the inert gas, the absorption of nitrogen into the steel may be considerable in particular where nitrogen is being blown in shortly before the end of the oxygen blowing process. For this reason it is preferable for nitrogen to be used as the inert gas first during an initial period and then for the last 20 to 30% of the oxygen blowing period to use argon as the inert gas, i.e. to use argon during the period when the absorption of nitrogen into the steel takes place rapidly.

In order to achieve good homogenization of the bath by bubbling inert gases through it, it is preferable according to the invention for the inert gas to be passed in through the bottom of the converter at one or more points which are located at a distance x which is in the range 0.35 r to 0.45 r, where r is the radius of the inside face of the newly lined converter wall, from the central vertical axis of the converter.

In Dutch patent application No. 8104474 mentioned above there is a description of how the best results can be achieved when using secondary oxygen. In the combination of measures of the present invention, it is preferred that the secondary oxygen is blown out at a level from 500 to 1000 mm above the main oxygen lancehead at an angle in the range of 30° to 45° (more preferably 30° to 38°) to the longitudinal direction of the lance.

A cheap but effective method of adding carboncontaining fuel to the bath is to add anthracite pieces of dimensions between 7 and 50 mm.

BRIEF DESCRIPTION OF THE DRAWINGS

Preferred embodiments of the invention will now be described by way of example, together with comparative examples and other explanation helpful to understanding of the invention, with reference to the accompanying drawings in which.

DESCRIPTION OF THE PREFERRED EMBODIMENTS

Figure 1:
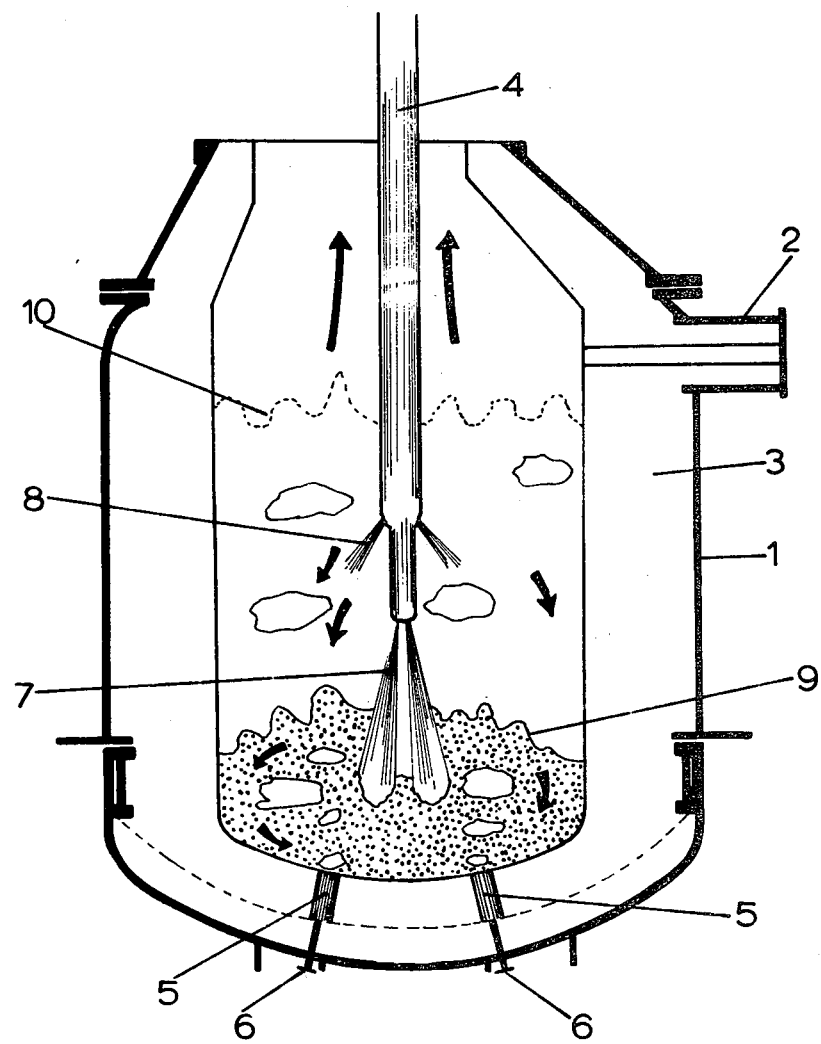
FIG. 1 shows a steel converter in use in a process embodying the invention.

FIG. 1 shows the steel structure 1 of a steel converter having a tap-hole 2 and a refractory lining 3. The converter shown is given only as an example, and in practice many variations on this shape occur. An oxygen blowing lance 4 is inserted into the converter from above, and in the converter bottom porous bricks 5 are arranged, connected to gas supplies 6. These bricks 5 are offset from the central vertical axis of the converter by about 40% of the internal radius of the newly-lined lining 3. A suitable structure of such a porous brick is described in the Dutch patent application No. 8105221 mentioned above. By blowing inert gas through the porous bricks 5, gas bubbles are created which rise up through the contents of the bath, producing a stirring effect.

The blowing lance 4 terminates in a head having openings through which the primary oxygen 7 is blown into the bath, and at a distance in the range 500–1000 mm above this head, has openings through which secondary oxygen 8 is blown out above the level 9 of the steel bath. FIG. 1 shows schematically the highest level 10 up to which the foaming slag can come. The structure of the blowing lance 4 used is suitably as described in greater detail in Dutch patent application No. 8104474. In this case the quantity of secondary oxygen blown amounts to about 15% of the quantity of primary oxygen. The secondary oxygen is blown in at an angle of about 38° to the longitudinal direction of the lance.

With a converter as shown in FIG. 1 and a charge weight of about 100 tons a number of steel-making processes were carried out to ascertain the effects of various process techniques. In this the converter was on each occasion charged with pig iron and scrap in accordance with Table I.

TABLE 1

| Charge data | |
| --- | --- |
| Pig iron: weight | 80–90 t |

TABLE 1-continued

| Charge data | |
| --- | --- |
| composition (by weight) | C ~4.5% |
| | Mn 0.6–0.8% |
| | P ≈0.09–0.13% |
| | S ≈0.015–0.030% |
| | Si ≈0.4–0.9% |
| | Ti ≈0.07–0.11% |
| Scrap: weight | 16–30 t |
| Additives: | |
| during oxygen blowing the following were added: | |
| calcium | 3500–4500 kg |
| ore | 0–1500 kg |
| cooling slag | 500–2000 kg |
| fluorspar | 0–200 kg |
| oxygen | 333 Nm³/min. (4400–5000 Nm³ in total) |

With this charge, first a reference test was carried out using an oxygen lance without secondary oxygen supply, without bubbling inert gas through the converter bottom and without addition of carbon through the converter mouth. Then four series of tests were carried out according to four respective methods (described below) in each of which one or more of the process factors (a) use of oxygen, (b) bubbling inert gas through the converter bottom, (c) addition of carbon through the converter mouth was modified. In particular, in the series of tests called "Method 1" the only addition to the reference test was that inert gas was bubbled through the bottom in large quantities. In the series of tests called "Method 2" the process was as in Method 1, but the total quantity of inert gas was reduced and the rate of bubbling of the gas was varied. The tests of the series called "Method 3" were as those of Method 2 but in addition use was made of an oxygen lance providing a supply of secondary oxygen. The tests of the series called "Method 4" were as those of Method 3 but in addition anthracite was added to the reaction during oxygen blowing. These series of tests are summarized in the following Table II.

TABLE II

| Method | Description |
| --- | --- |
| 1. | bubbling inert gas through bottom inert gas rate: 8.5 Nm³/min total volume of inert gas: 140 Nm³ per charge |
| 2. | bubbling inert gas through bottom reduced flow rate for first 10 mins of oxygen blowing time: 2 Nm³/min increased flow rate after 10 mins to end of oxygen blowing: 8.5 Nm³/min total volume of inert gas: 70 Nm³ per charge |
| 3. | as 2, but with oxygen lance with secondary oxygen outlets secondary oxygen flow rate: 50 Nm³/min |
| 4. | as 3, but with addition of anthracite from above during the 4th minute of the oxygen blowing, in the amount of 1 ton/charge |

Only Method 4 is an example of the invention.

Figure 2A:
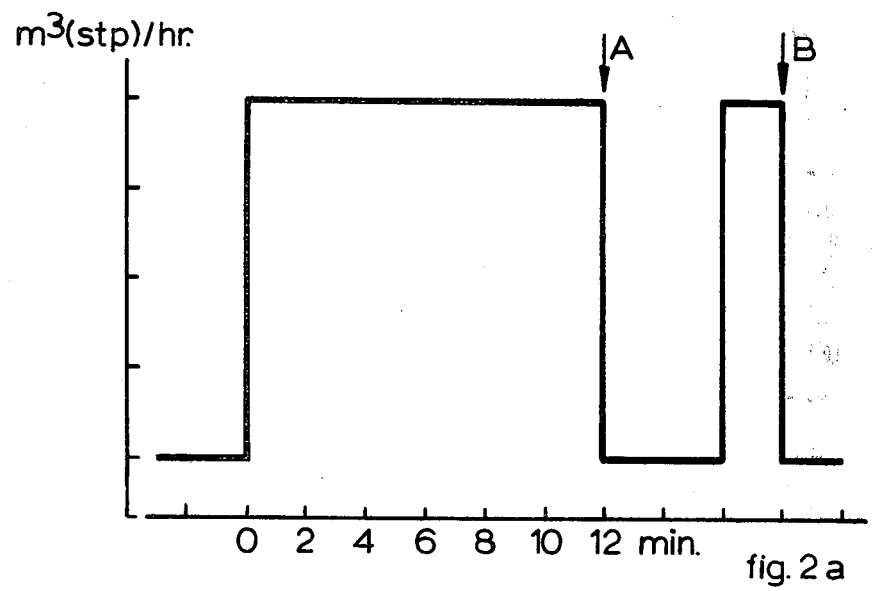
FIGS. 2a and 2b are diagrams illustrating two different procedures for bubbling gas through the bottom of the converter.
Figure 2B:
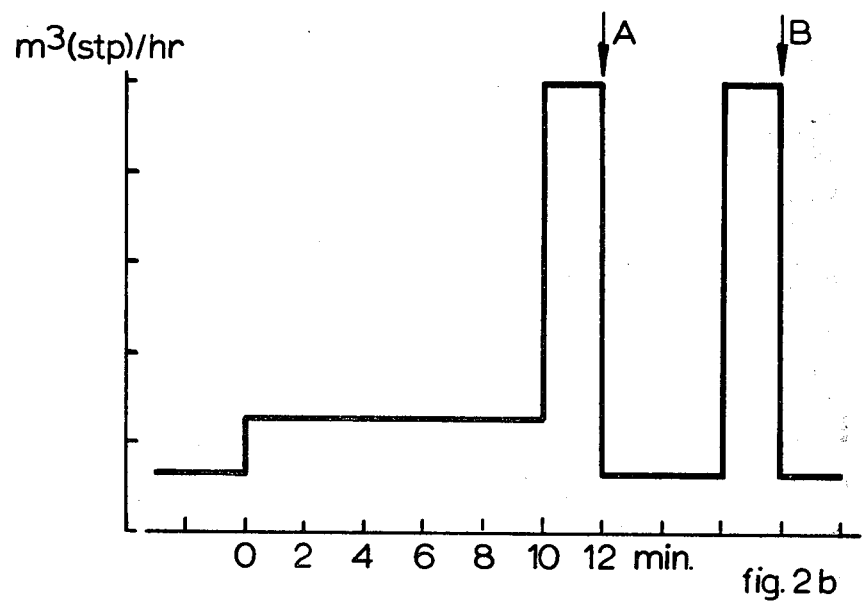

The difference between Methods 1 and 2 is explained in greater detail in FIGS. 2a and 2b, whose vertical scales show the quantity of inert gas added at different times during the oxygen blowing. At points A and B intermediate stoppages are made in the process. FIG. 2a illustrates Method 1, in which during the whole oxygen blowing period inert gas is bubbled through at a high level. FIG. 2b shows Method 2 where for the first 10 minutes of the oxygen blowing period the gas is bubbled through at a low rate which is then increased. This gives intensive stirring during the final phase of the blowing process, while overall the inert gas has a much lesser cooling effect on the molten bath.

Table III sets out the results of the Method 1 series of tests and the reference test. A distinction has been made between tests which were carried out to a low final carbon percentage (C≦0.1%) and to a medium C content (C between 0.1 and 0.5%).

TABLE III

| quality | low C | | medium C | |
|---|---|---|---|---|
| blowing method | ref test | Method 1 | ref test | Method 1 |
| number of charges | 45 | 22 | 32 | 50 |
| Fe content of the steel slag % | 17.0 | 14.5 | 13.0 | 10.0 |
| Mn content of the steel on tapping % | 0.18 | 0.22 | 0.30 | 0.45 |
| % liquid metal charge | 73.3 | 78.3 | 73.7 | 79.3 |
| ore, kg | 1221 | 708 | 855 | 435 |
| % liquid metal charge standardized for 500 kg ore | 71.9 | 77.9 | 73.0 | 79.4 |
| $CO_2$, % | 12 | 8 | 12 | 8 |

Notes
1. The percentage of liquid metal charge is defined as the percentage ratio of the weight of liquid pig iron used to the sum of the weights of the pig iron, the scrap, 68% of the ore used and 80% of the ladle additions.
2. The percentage of $CO_2$ given is calculated from the heat and materials balances of the charges.

Table III clearly shows the effect of intensive bubbling of inert gas through the bottom. In particular a considerable improvement in the metal yield for manganese can be seen, while considerably less iron is lost in the steel slag. On the other hand it would seem that the percentage liquid charge must be greatly increased to achieve the required tapping temperature. Due to the difference in the cost price of slag and molten pig iron, this means a very great increase in the cost of steel.

Table IV shows the results of the tests of Method 2, compared with reference tests not using any inert gas bubbling.

TABLE IV

| quality | Low C | | Medium C | |
|---|---|---|---|---|
| blowing method | ref test | Method 2 | ref test | Method 2 |
| number of charges | 88 | 41 | 147 | 39 |
| Fe content of the steel slag, % | 17 | 31 | 13 | 10 |
| Mn content of the steel on tapping % | 0.20 | 0.25 | 0.30 | 0.38 |
| % liquid metal charge | 73.3 | 75.7 | 74.2 | 77.8 |
| ore, kg | 833 | 642 | 626 | 467 |
| % liquid metal charge standardized for 500 kg ore | 72.7 | 75.4 | 74.0 | 77.8 |
| $CO_2$, % | 12 | 12 | 12 | 12 |

These results show that the change in inert gas bubbling method does not seem to have any effect on the yield for iron and manganese as compared with Method 1. However the percentage of liquid metal charged i improved, though it is still higher than for the reference test.

Table V gives the results for Method 3 and reference tests, from which the additional effect of using secondary oxygen can be examined. It was found that there is again the same good yield results for iron and manganese and that in addition the percentage of liquid metal charged and the quantity of ore required are improved.

The table gives the Fe and Mn contents as differences from the values in the reference tests.

TABLE V

| quality | Low C | | Medium C | |
|---|---|---|---|---|
| blowing method | ref. test | Method 3 | ref. test | Method 3 |
| number of charges | 88 | 5 | 147 | 11 |
| Fe content of steel slag % | | −14 | | −3 |
| Mn content of the steel on tapping % | | +0.05 | | +0.08 |
| % liquid metal charge | 73.3 | 74.0 | 74.2 | 74.5 |
| ore, kg | 833 | 1000 | 626 | 774 |
| % liquid metal charge standardized for 500 kg ore | 72.2 | 73.0 | 74.0 | 73.9 |
| $CO_2$, % | 12 | 15 | 12 | 15 |

Finally for the series of tests according to Method 4, there was used bubbling of inert gas through the converter bottom, and an oxygen lance with a secondary oxygen supply and in addition pieces of anthracite were added to the converter in the 4th minute of the oxygen blowing process. It should be noted that the addition of anthracite to a converter charge is in itself a known technique, and can give a reduction in the amount of pig iron used of about 2%. This shows that the thermal efficiency of the combustion of the anthracite is about 50%.

In conjunction with bubbling through the base and the addition of secondary oxygen it was surprisingly found that the efficiency with which the heat of combustion of the anthracite is used by the steel bath increases to virtually 100%. The result of this is that the percentage of liquid metal charged can be reduced further about 5%. The previously found increases in the yield of iron and manganese do not seem to be affected by the addition of anthracite.

Table VI gives the results for Method 4, embodying the invention.

TABLE VI

| quality | Low C | | Medium C | |
|---|---|---|---|---|
| blowing method | ref. test | Method 4 | ref. test | Method 4 |
| number of charges | 88 | 7 | 147 | 14 |
| % Fe in slag and % Mn in steel | as in Tables 4 and 5 | | | |
| % liquid metal charge | 73.3 | 68.0 | 74.2 | 67.2 |
| ore, kg | 833 | 1195 | 676 | 1056 |
| % liquid metal charge standardized for 500 kg ore | 72.2 | 66.8 | 73.8 | 66.2 |

A comparison of Table VI with the previous Tables clearly shows that in Method 4, a considerable increase in the iron and manganese yield can be achieved as well as a marked increase in the possible amount of scrap which may be used.

Figure 6:
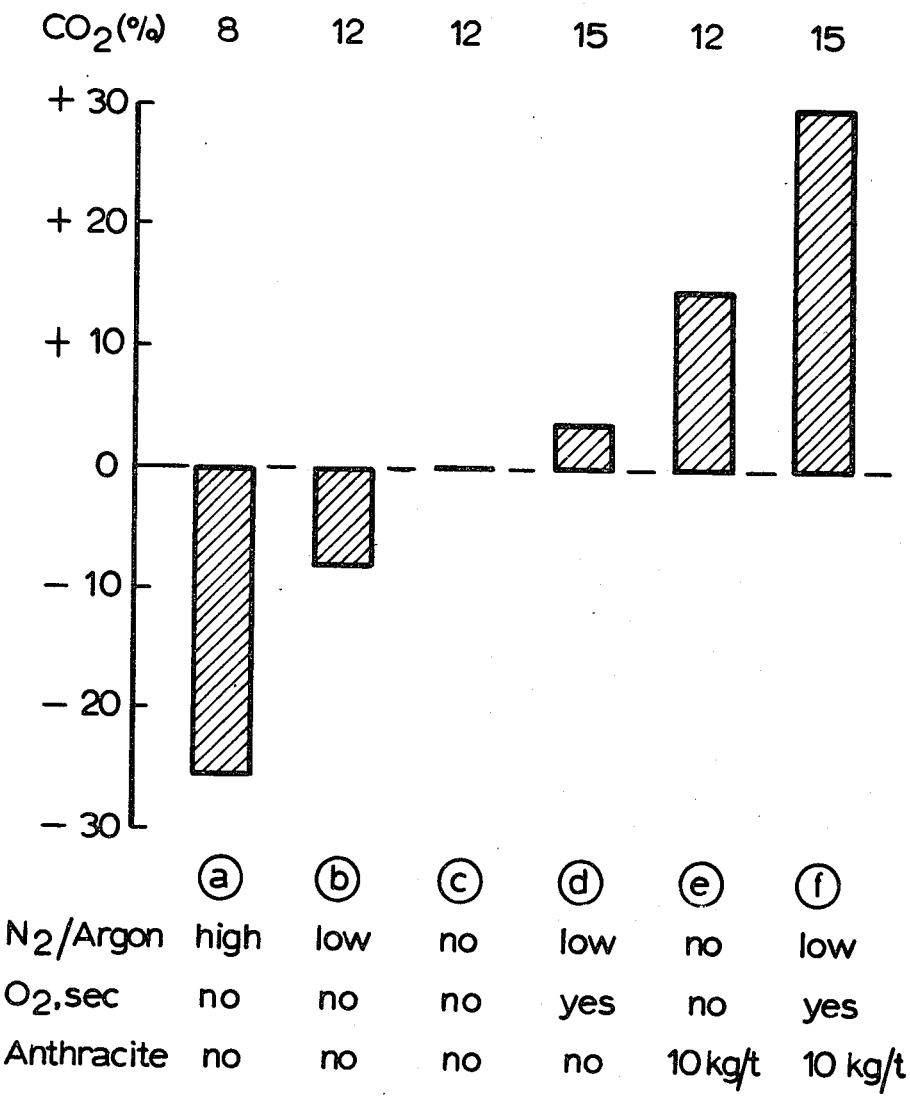
FIG. 6 is a diagram which illustrates the effect of various process factors on the amount of scrap which can be used in steel-making processes.

As the use of scrap is an important variable in the economy of steelmaking, FIG. 6 again schematically shows the effect of the various process factors on the consumption of scrap. Some of these results are obtained from additional series of tests, so this figure cannot be compared in detail with the tables given above. For various process conditions (a) to (f) set out at the bottom of the figure, the increase or reduction in the quantity of scrap used in kg per ton of the charge weight is indicated by the bar. The condition of process (f) correspond to the present invention. In addition the top part of the figure also gives the $CO_2$ content in the gases given off, which gives an indication of the efficiency of combustion of carbon from the process. This also clearly shows that the combination of process (f) i.e. limited bubbling of inert gas through the bottom, the addition of secondary oxygen and the addition of anthracite gives the greatest increase in the use of scrap, in conjunction with the most complete combustion of carbon from the process. The percentage increase in the use of scrap is better than could be expected from combining the results of processes (d) and (e). It is clear that an unexpected synergistic effect is involved in the process of the invention.

Figure 3:
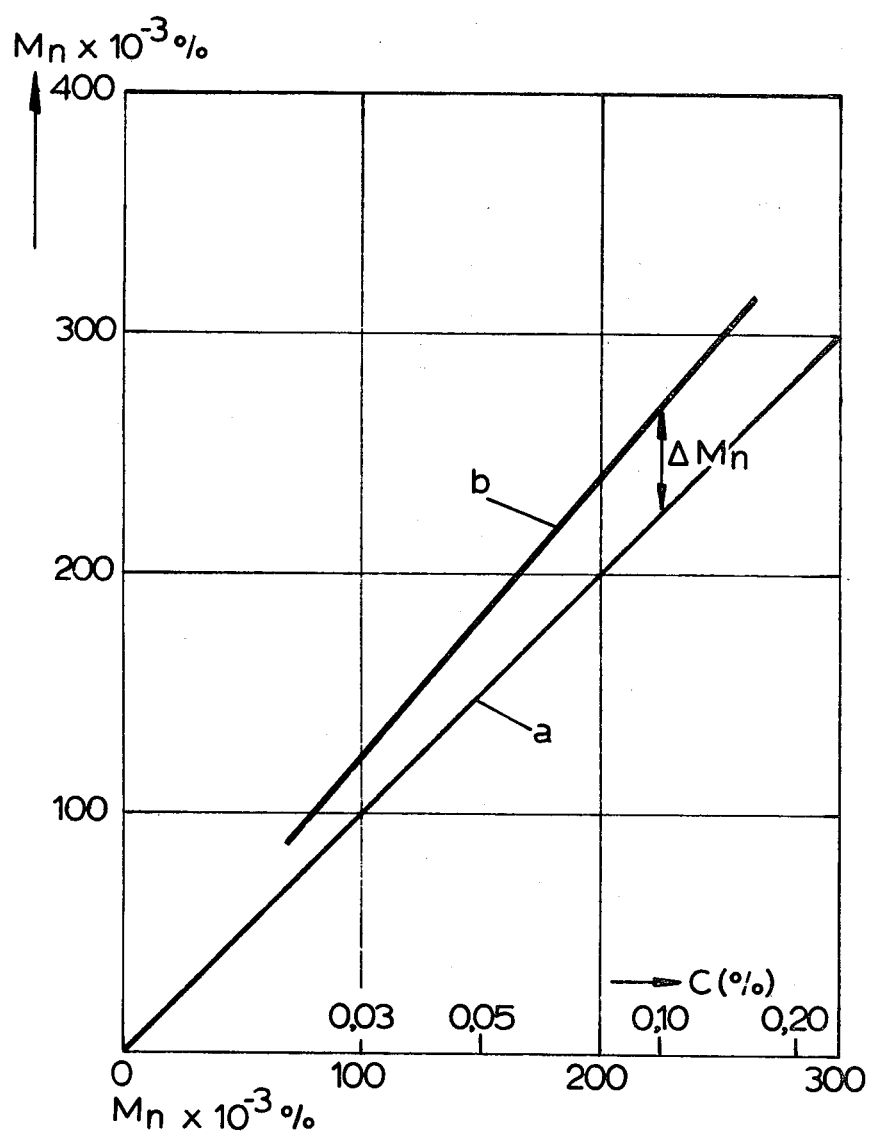
FIG. 3 is a graph which shows the effect of processes of the invention on the manganese content in the bath.
Figure 4:
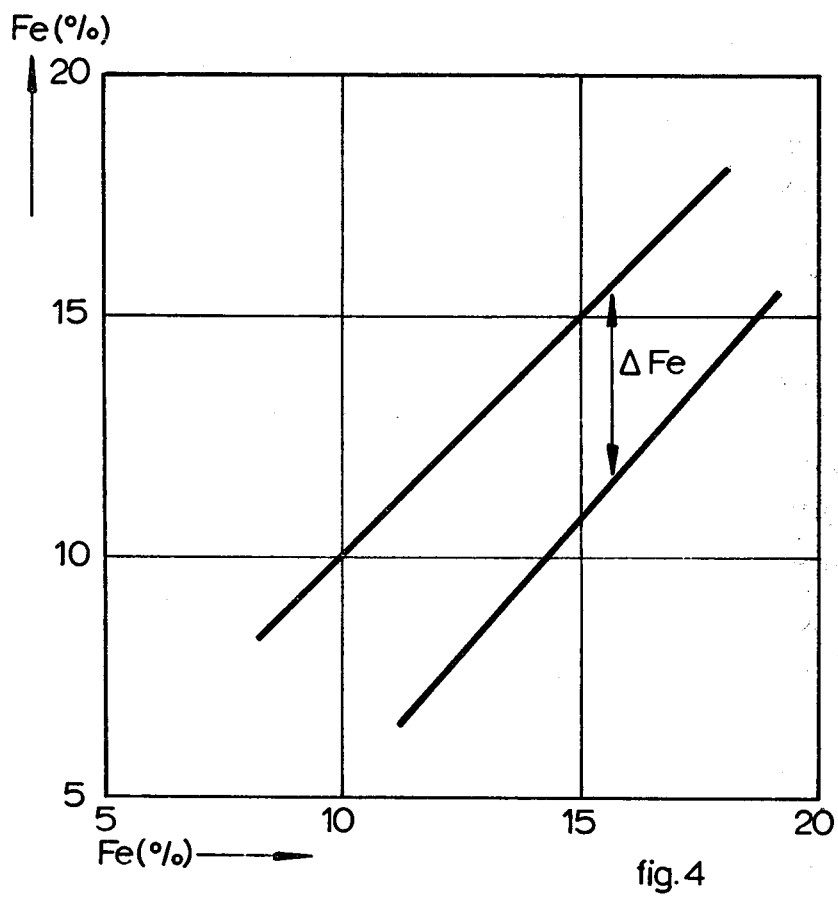
FIG. 4 is a graph which shows the effect of process of the invention on the iron content in the slag.

FIGS. 3 and 4 show separately the effect of bubbling inert gas through the converter bottom on the yields of manganese and iron. FIG. 3 shows the manganese yield as the vertical axis, while the horizontal axis gives the percentage of manganese along the same axis as the corresponding percentages of carbon. The results for the cases where no gas is bubbled through the bottom are thus given by line a in the figure while the results where gas is bubbled are shown by line b. The difference in height between lines a and b illustrates the improvement in the manganese yield for various carbon contents. In FIG. 4 both axes given the iron content as a percentage in the slag, in the case of the horizontal axis without any gas being bubbled through the bottom. When gas is bubbled through the bottom, the measured results for the Fe content of the slag are shown by line b. The difference between lines b and a illustrates the reduction of the quantity of iron which is lost into the slag.

Figure 5:
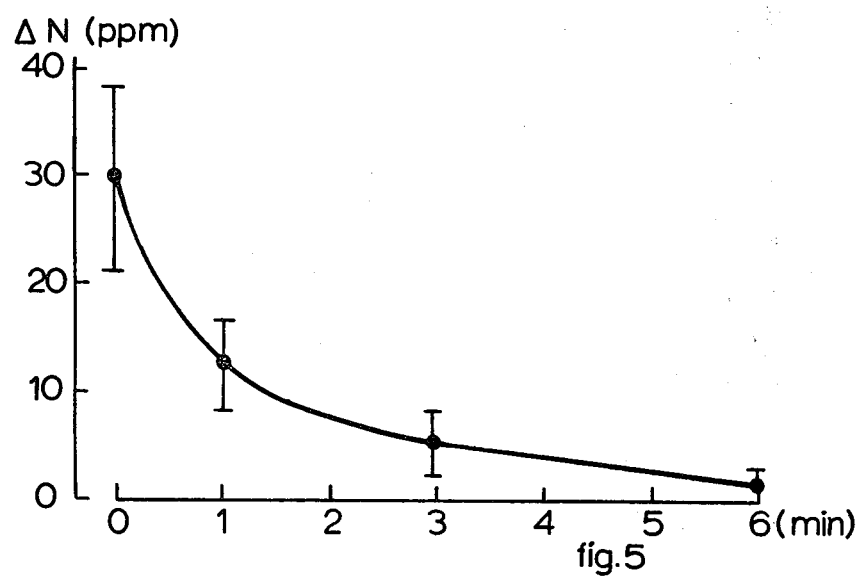
FIG. 5 is a graph which illustrates the absorption of nitrogen into the steel.

FIG. 5 illustrates how during blowing of nitrogen through the converter bottom, nitrogen is absorbed by the steel. The horizontal axis represents the number of minutes before the end of oxygen blowing and the vertical axis gives the quantity of nitrogen absorbed by the steel. From this it can be seen that a significant level of nitrogen absorption only occurs from about 5 minutes before the end of oxygen blowing onwards, so that it is recommended that at about this time the admission of nitrogen is replaced by admission of argon.

What is claimed is:

1. In a process of producing steel in a converter, wherein the starting materials comprise pig iron and ferrous scrap and wherein oxygen is blown from above upon the molten metal bath in the converter, the improvement of the combination of the following process steps:
   (a) of blowing oxygen into the bath through a first orifice, and of passing inert gas through the bottom of the converter into the bath during at least part of the time of blowing oxygen,
   (b) during at least part of the time of blowing oxygen into the bath through a first orifice, blowing oxygen through a second orifice into the atmosphere above the bath,
   (c) at least once during the time of blowing oxygen into the bath, adding carbon to the reaction from above.

2. Process according to claim 1 wherein the pig iron used is low-phosphorus pig-iron.

3. Process according to claim 1 wherein the rate of supply of the inert gas through the bottom of the converter is low during an initial part of the time of blowing oxygen into the bath and is at a rate in the range 4 to 8 $Nm^3/h$ per ton of steel during a final part of the time of blowing oxygen into the bath.

4. Process according to claim 3 wherein the inert gas passed into the bath through the converter bottom is nitrogen for an initial part of the time of blowing oxygen into the bath, and is argon for a final part amounting to 20 to 30% of the time of blowing oxygen into the bath.

5. Process according to any one of claims 1, 3 or 4 wherein the inert gas is passed into the bath through the bottom of the converter at one or more locations each located, at the inside of the converter wall when newly lined, at a distance x from the vertical axis of the converter given by $0.35\ r < x < 0.45\ r$ where r is the radius of the inside of the converter wall when newly lined.

6. Process according to claim 1 wherein the second orifice for blowing oxygen is part of a lance used to blow the oxygen into the bath through the first orifice, the second orifice being located at between 500 and 1000 mm above the discharge end of the lance and the second orifice being directed downwardly at an angle in the range 30° to 45° to the longitudinal direction of the lance.

7. Process according to claim 6 wherein the second orifice is directed downwardly at an angle in the range 30° to 38° to the longitudinal direction of the lance.

8. Process according to any one of claims 1, 3 or 6 wherein the carbon added is in the form of anthracite in pieces having dimensions in the range 7 to 50 mm.

9. A process of producing steel in a steel converter comprising the steps of
   (i) introducing starting materials comprising pig iron and ferrous scrap into said converter
   (ii) forming a molten metal bath from said starting materials
   (iii) blowing a primary stream of oxygen into said molten metal bath
   (iv) during at least part of the time of blowing of said primary stream of oxygen into the bath, blowing an inert gas through the bottom of the converter into said molten metal bath,
   (v) during at least part of the time of blowing of said primary oxygen into the bath, blowing a secondary stream of oxygen into the atmosphere above the bath, and
   (vi) at least once during the time of blowing oxygen into the bath, adding carbon to the converter contents from above.

* * * * *